US012117164B1

(12) United States Patent
Baker, Jr.

(10) Patent No.: US 12,117,164 B1
(45) Date of Patent: Oct. 15, 2024

(54) LIGHT COLOR CHANGING APPARATUS

(71) Applicant: Alphonso Baker, Jr., Arlington, TX (US)

(72) Inventor: Alphonso Baker, Jr., Arlington, TX (US)

( * ) Notice: Subject to any disclaimer, the term of this patent is extended or adjusted under 35 U.S.C. 154(b) by 0 days.

(21) Appl. No.: 18/386,644

(22) Filed: Nov. 3, 2023

(51) Int. Cl.
*F21V 9/40* (2018.01)
*F21V 17/00* (2006.01)
*F21V 17/04* (2006.01)

(52) U.S. Cl.
CPC .............. *F21V 9/40* (2018.02); *F21V 17/002* (2013.01); *F21V 17/04* (2013.01)

(58) Field of Classification Search
CPC . F21V 9/40; F21V 9/08; F21V 17/002; F21V 17/16; F21V 17/04
USPC .................................................. 362/317, 278
See application file for complete search history.

(56) References Cited

U.S. PATENT DOCUMENTS

| | | | | |
|---|---|---|---|---|
| 6,155,695 | A | 12/2000 | Sealy | |
| 7,176,606 | B2 | 2/2007 | Schaefer | |
| 8,317,365 | B2 | 11/2012 | Tracy | |
| 9,200,755 | B1 | 12/2015 | Corey | |
| D770,080 | S | 10/2016 | Sanders | |
| 9,797,578 | B2 | 10/2017 | Wang | |
| 11,788,709 | B1 * | 10/2023 | Baker, Jr. | F21V 23/04 362/293 |
| 2006/0109641 | A1 * | 5/2006 | Fong | G03B 15/03 362/16 |
| 2006/0203498 | A1 | 9/2006 | Lin | |
| 2010/0002451 | A1 * | 1/2010 | Reynolds | F21S 8/02 362/363 |
| 2011/0044055 | A1 * | 2/2011 | Singer | H01J 61/34 362/351 |
| 2011/0181172 | A1 * | 7/2011 | Gruber | F21V 3/02 313/312 |
| 2013/0148358 | A1 | 6/2013 | Harooni | |
| 2018/0125762 | A1 | 5/2018 | Fernandez | |
| 2019/0032889 | A1 * | 1/2019 | Meng | F21V 9/08 |
| 2019/0186725 | A1 | 6/2019 | Vincent | |

FOREIGN PATENT DOCUMENTS

| | | |
|---|---|---|
| JP | 3146790 | 12/2008 |

* cited by examiner

*Primary Examiner* — Laura K Tso

(57) ABSTRACT

A light color changing apparatus for changing the color of a light emitted by a light source includes a transparent covering which is colored to cause a light emitted through the covering to change in color. The covering has an end wall which is positionable to extend over the light source. A perimeter wall is attached to the end wall via an intermediate wall that converges inwardly from the end wall so that the end wall is wider than the perimeter wall when the perimeter wall is at rest. The perimeter wall is resiliently stretchable to receive the light source.

11 Claims, 5 Drawing Sheets

LIGHT COLOR CHANGING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to light color changing apparatus and more particularly pertains to a new light color changing apparatus for changing the color of a light emitted by a light source.

(2) Description of Related Art Including Information Disclosed Under 37 CFR 1.97 and 1.98

The prior art describes myriad devices for changing the color of a light emitted by a light source. However, the prior art fails to disclose such a device which is removably attachable to a variety of differently sized light sources by resiliently stretching a perimeter wall of the device around a selected light source, and which has an end wall which is wider than the perimeter wall. Such an apparatus would be advantageous in facilitating attachment to variously sized light sources while maintaining the end wall entirely over the light source without substantially deforming the end wall.

BRIEF SUMMARY OF THE INVENTION

An embodiment of the disclosure meets the needs presented above by generally comprising a covering which defines an interior space with a size such that the covering is configured to receive a light source into the interior space. The covering comprises a transparent material which has a cover color such that the covering is configured to cause a light of a first color emitted by the light source to be changed in color to a second color. The covering includes an end wall, an intermediate wall, and a perimeter wall. The intermediate wall is coupled to and extends away from a perimeter edge of the end wall, converging inwardly from the end wall to a distal edge of the intermediate wall with respect to the end wall. The perimeter wall is coupled to and extends away from the distal edge of the intermediate wall. A free edge of the perimeter wall opposite the intermediate wall defines an opening to the interior space. The perimeter wall is resiliently stretchable so that the perimeter wall is configured to stretch around the light source.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
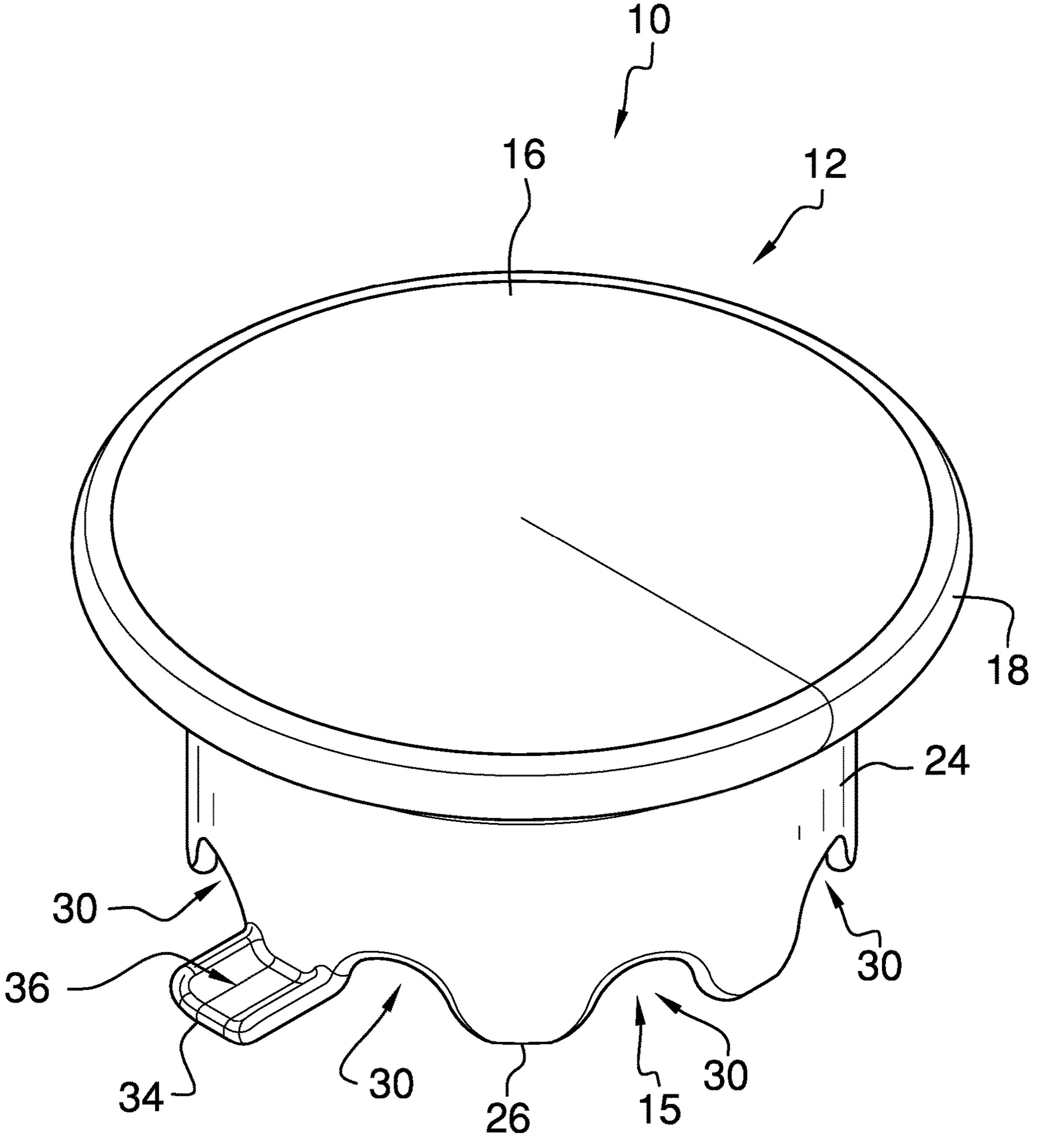
FIG. 1 is a perspective view of a light color changing apparatus according to an embodiment of the disclosure.
Figure 2:
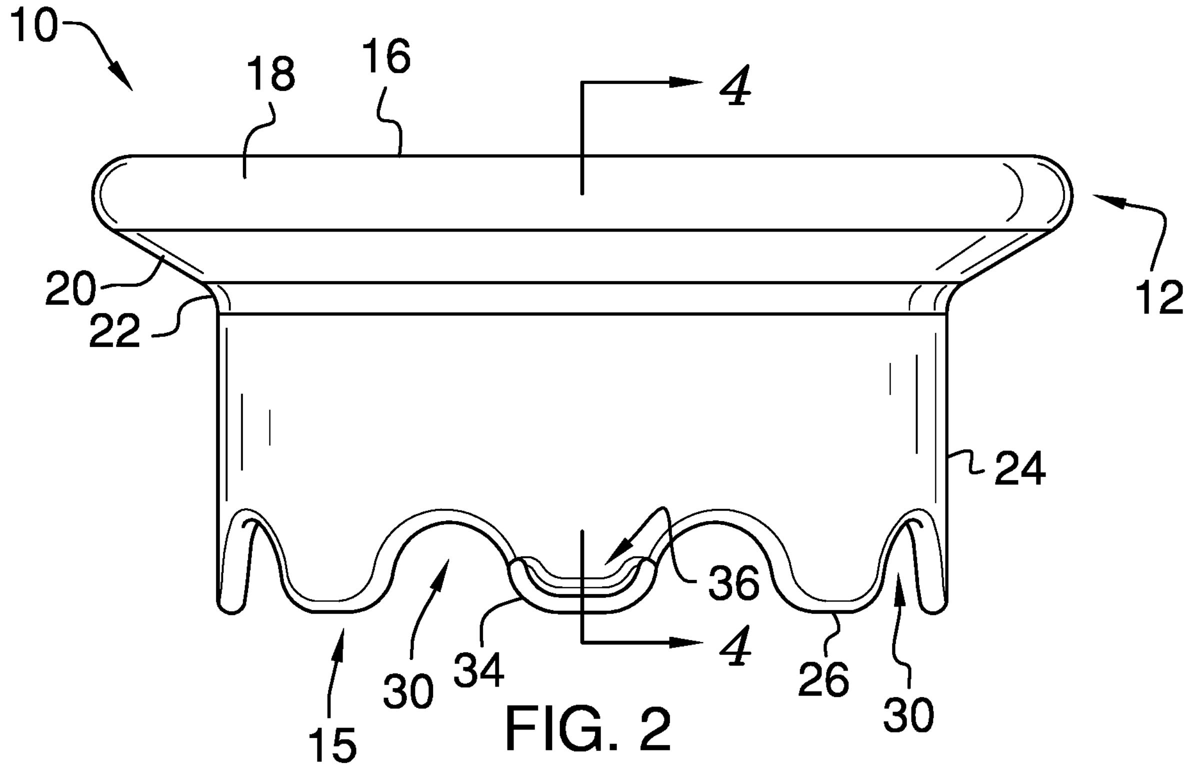
FIG. 2 is a front view of an embodiment of the disclosure.
Figure 3:
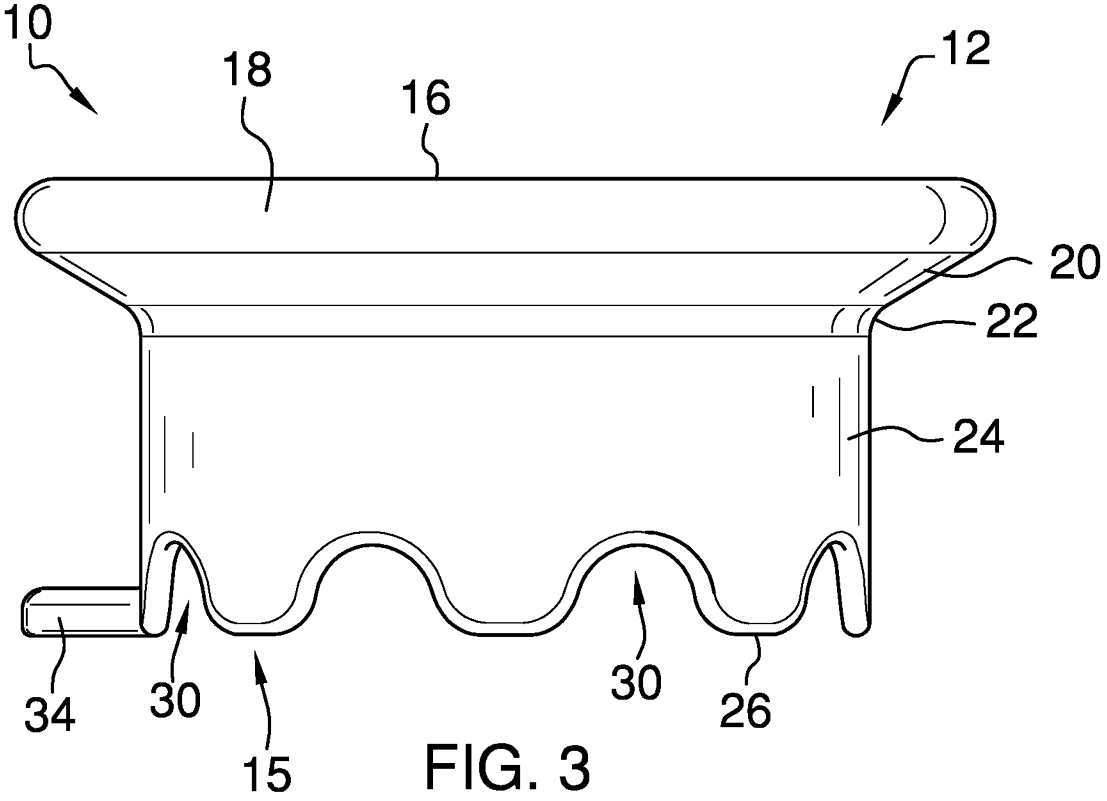
FIG. 3 is a side view of an embodiment of the disclosure.
Figure 4:
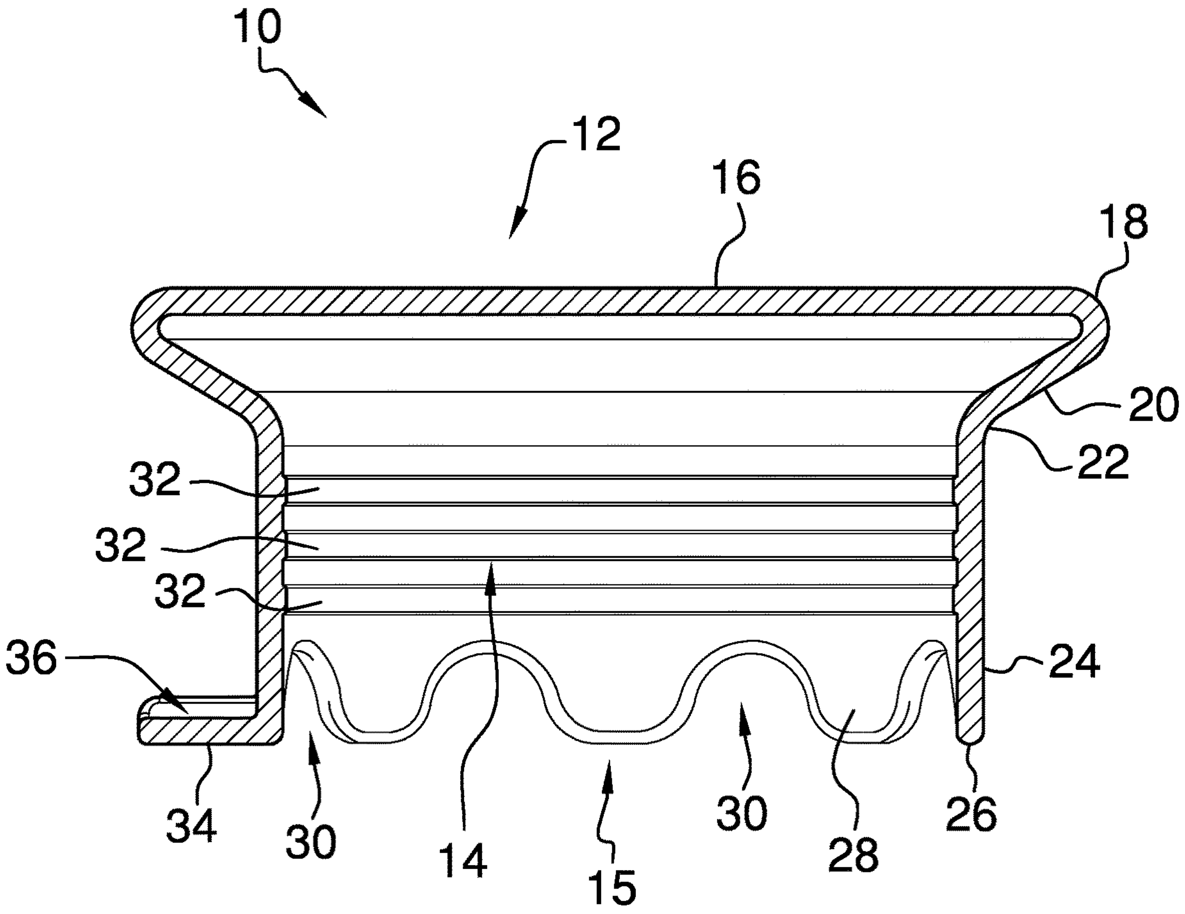
FIG. 4 is a cross-section view of an embodiment of the disclosure taken from Arrows 4-4 in FIG. 2.
Figure 5:
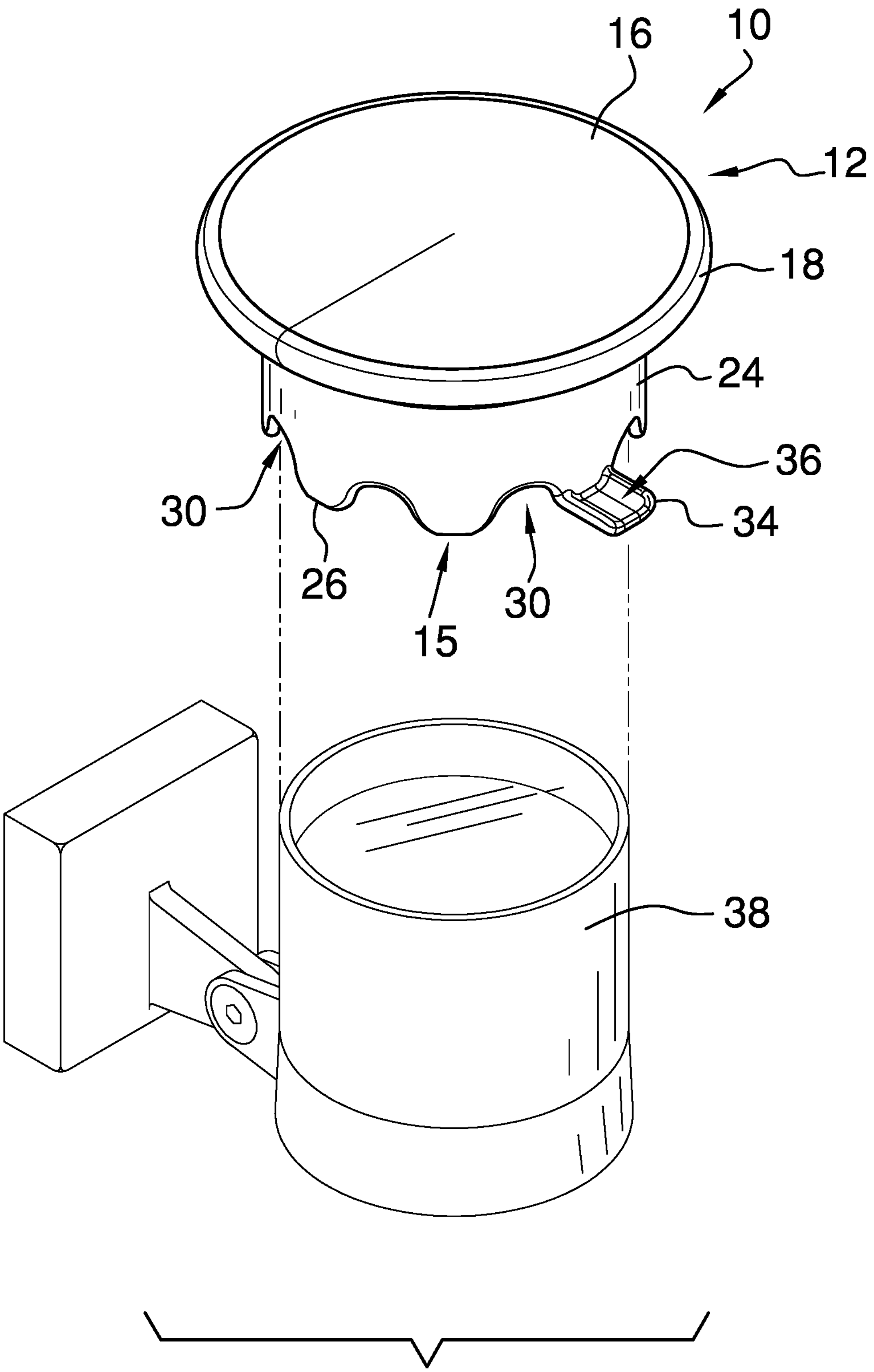
FIG. 5 is an exploded perspective view of an embodiment of the disclosure and a light source.
Figure 6:
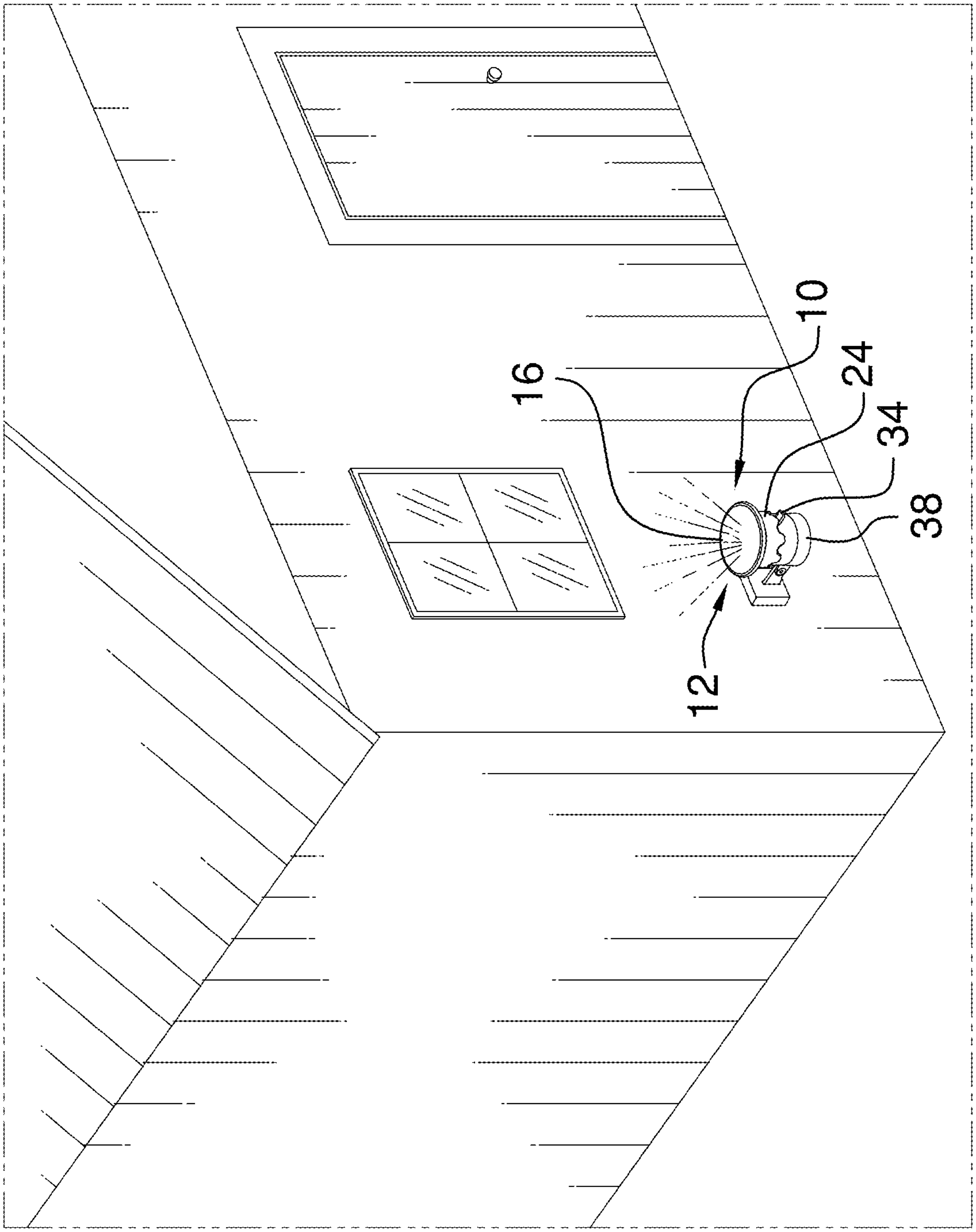
FIG. 6 is an in-use view of an embodiment of the disclosure over a light source.

With reference now to the drawings, and in particular to FIGS. 1 through 6 thereof, a new light color changing apparatus embodying the principles and concepts of an embodiment of the disclosure and generally designated by the reference numeral 10 will be described.

As best illustrated in FIGS. 1 through 6, the light color changing apparatus 10 generally comprises a covering 12 defining an interior space 14 with a size such that the covering 12 is configured to receive a light source 38 into the interior space 14. The covering 12 comprises a transparent material which has a cover color such that the covering 12 is configured to cause a light of a first color emitted by the light source 38 to be changed in color to a second color. The transparent material comprises a plastic material such as high tempered polycarbonate.

The covering 12 includes an end wall 16, an intermediate wall 20, and a perimeter wall 24. The end wall 16 has a circular shape and is planar. The intermediate wall 20 is coupled to and extends away from a perimeter edge 18 of the end wall 16. The intermediate wall 20 converges inwardly from the end wall 16 to a distal edge 22 of the intermediate wall 20 with respect to the end wall 16. The intermediate wall 20 extends along an entirety of the perimeter edge 18. The perimeter wall 24 is coupled to and extends away from the distal edge 22 of the intermediate wall 20. A free edge 26 of the perimeter wall 24 opposite the intermediate wall 20 defines an opening 15 to the interior space 14. The perimeter wall 24 is resiliently stretchable and has a cylindrical shape. The free edge 26 of the perimeter wall 24 defines a plurality of recesses 30 distributed along an entirety of the free edge 26 which are evenly spaced from each other.

The perimeter wall 24 is enhanced by a plurality of ribs 32 coupled to an interior side 28 of the perimeter wall 24. Each rib 32 of the plurality of ribs 32 extends around a central longitudinal axis of the perimeter wall 24. In other embodiments, the perimeter wall 24 may be frictionally enhanced by nodules or other textures. A pull tab 34 is coupled to the free edge 26 of the perimeter wall 24 and extends outwardly from the perimeter wall 24. The pull tab 34 has a U-shape, and a concave surface 36 of the pull tab 34 faces the end wall 16.

The covering 12, the plurality of ribs 32, and the pull tab 34 are integrally formed with each other and are constructed of the transparent material, which is resiliently stretchable such that the perimeter wall 24 stretches as described. In some embodiments, the perimeter wall 24 comprises a distinct material from the transparent material which is resiliently stretchable. The distinct material may comprise polycarbonate, rubber, silicone, or the like.

In use, the perimeter wall 24 of the covering 12 is stretched to receive the light source 38 through the opening 15 into the interior space 14. The perimeter wall 24 resiliently contracts around the light source 38, frictionally engaging the light source 38 with the plurality of ribs 32 to secure the covering 12 to the light source 38. The end wall 16 is positioned so as to be in the path of the light emitted by the light source 38 when the light source 38 is activated. The end wall 16 changes the light in color from the first color to the second color.

The light source 38 may be defined by a light bulb, a light fixture, or the like. The intermediate wall 20 converges inwardly from the end wall 16 so that the perimeter wall 24 may interchangeably engage different light sources 38 of various sizes without substantially altering the shape of the end wall 16. The perimeter wall 24 stretches and the intermediate wall 20 bends and stretches to accommodate a selected light source 38 without deforming substantially the end wall 16. The end wall 16, by having a greater width than the width of the perimeter wall 24 while at rest, is also able to extend entirely over light sources 38 which have a width greater than the width of the perimeter wall 24 while at rest. The perimeter wall 24 will stretch to accommodate such light sources 38 while the end wall 16 extends over the light source 38 without substantially deforming.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A light color changing apparatus comprising a covering defining an interior space, the interior space having a size such that the covering is configured to receive a light source into the interior space, the covering comprising a transparent material, the transparent material having a cover color such that the covering is configured to cause a light of a first color emitted by the light source to be changed in color to a second color, the covering including:

an end wall;

an intermediate wall being coupled to and extending away from a perimeter edge of the end wall, the intermediate wall converging inwardly from the end wall to a distal edge of the intermediate wall with respect to the end wall;

a perimeter wall being coupled to and extending away from the distal edge of the intermediate wall, a free edge of the perimeter wall opposite the intermediate wall defining an opening to the interior space, the perimeter wall being resiliently stretchable; and a pull tab being coupled to the free edge of the perimeter wall, the pull tab extending outwardly from the perimeter wall.

2. The apparatus of claim 1, wherein the transparent material comprises a plastic material.

3. The apparatus of claim 1, wherein the intermediate wall extends along an entirety of the perimeter edge.

4. The apparatus of claim 1, wherein the perimeter wall has a cylindrical shape.

5. A light color changing apparatus comprising a covering defining an interior space, the interior space having a size such that the covering is configured to receive a light source into the interior space, the covering comprising a transparent material, the transparent material having a cover color such that the covering is configured to cause a light of a first color emitted by the light source to be changed in color to a second color, the covering including:

an end wall;

an intermediate wall being coupled to and extending away from a perimeter edge of the end wall, the intermediate wall converging inwardly from the end wall to a distal edge of the intermediate wall with respect to the end wall;

a perimeter wall being coupled to and extending away from the distal edge of the intermediate wall, a free edge of the perimeter wall opposite the intermediate wall defining an opening to the interior space, the perimeter wall being resiliently stretchable; and wherein the free edge of the perimeter wall defines a plurality of recesses distributed along an entirety of the free edge, the plurality of recesses being evenly spaced from each other.

6. The apparatus of claim 1, further comprising a plurality of ribs being coupled to an interior side of the perimeter wall, the plurality of ribs being configured to frictionally engage the light source.

7. The apparatus of claim 6, wherein each rib of the plurality of ribs extends in a plane parallel to the end wall.

8. The apparatus of claim 1, wherein the pull tab has a U-shape, a concave surface of the pull tab facing the end wall.

9. The apparatus of claim 1, wherein the end wall has a circular shape.

10. The apparatus of claim 1, wherein the end wall is planar.

11. A light color changing apparatus comprising:

a covering defining an interior space, the interior space having a size such that the covering is configured to receive a light source into the interior space, the covering comprising a transparent material, the transparent material having a cover color such that the covering is configured to cause a light of a first color emitted by the light source to be changed in color to a second color, the transparent material comprising a plastic material, the covering including:

an end wall, the end wall having a circular shape, the end wall being planar;

an intermediate wall being coupled to and extending away from a perimeter edge of the end wall, the intermediate wall converging inwardly from the end wall to a distal edge of the intermediate wall with respect to the end wall, the intermediate wall extending along an entirety of the perimeter edge; and a perimeter wall being coupled to and extending away from the distal edge of the intermediate wall, a free edge of the perimeter wall opposite the intermediate wall defining an opening to the interior space, the perimeter wall being resiliently stretchable, the perimeter wall having a cylindrical shape, the free edge of the perimeter wall defining a plurality of recesses distributed along an entirety of the free edge, the plurality of recesses being evenly spaced from each other;

a plurality of ribs being coupled to an interior side of the perimeter wall, the plurality of ribs being configured to frictionally engage the light source, each rib of the plurality of ribs extending in a plane parallel to the end wall;

a pull tab being coupled to the free edge of the perimeter wall, the pull tab extending outwardly from the perimeter wall, the pull tab having a U-shape, a concave surface of the pull tab facing the end wall; and wherein the covering, the plurality of ribs, and the pull tab are integrally formed with each other.

* * * * *